United States Patent
Gwon et al.

(10) Patent No.: US 11,014,837 B2
(45) Date of Patent: May 25, 2021

(54) ENERGY SELF-CONTAINED OCEANIC DRONE FOR AI-BASED MARINE INFORMATION SURVEY AND SURVEILLANCE AND METHOD USING SAME

(71) Applicant: KWaterCraft Co., Ltd., Busan (KR)

(72) Inventors: Sun Cheol Gwon, Busan (KR); Dong Ha Lee, Busan (KR); Nam Ju Jo, Busan (KR); Tae Yoon Kim, Busan (KR); Sung Hoon Hong, Busan (KR); Gwang Hyo Jeong, Busan (KR); Jae-Myung Lee, Busan (KR)

(73) Assignee: KWaterCraft Co., Ltd., Busan (KR)

( * ) Notice: Subject to any disclaimer, the term of this patent is extended or adjusted under 35 U.S.C. 154(b) by 0 days.

(21) Appl. No.: 16/432,688

(22) Filed: Jun. 5, 2019

(65) Prior Publication Data
US 2019/0367387 A1    Dec. 5, 2019

(30) Foreign Application Priority Data
Jun. 5, 2018  (KR) .................. 10-2018-0064760

(51) Int. Cl.
*C02F 1/461*    (2006.01)
*G01V 1/38*    (2006.01)
(Continued)

(52) U.S. Cl.
CPC ......... *C02F 1/46104* (2013.01); *B63H 21/17* (2013.01); *C25B 1/04* (2013.01);
(Continued)

(58) Field of Classification Search
CPC .................. H01M 8/0656; G01C 11/00–34
See application file for complete search history.

(56) References Cited

U.S. PATENT DOCUMENTS 6,495,277 B1 * 12/2002 Edlund ............. H01M 8/04037
320/101
10,452,974 B1 * 10/2019 Cosic ...................... G06N 3/08
(Continued)

FOREIGN PATENT DOCUMENTS

| CN | 103791892 A | * | 5/2014 |
| KR | 2003-0059106 A | | 7/2003 |

(Continued)

OTHER PUBLICATIONS

Notice of Allowance dated Jul. 20, 2019, issued in corresponding Korean Application No. 10-2018-0064760, filed Jun. 5, 2018, 6 pages.

(Continued)

*Primary Examiner* — Nicholas A Smith
(74) *Attorney, Agent, or Firm* — Christensen O'Connor Johnson Kindness PLLC (57) ABSTRACT

Disclosed are an energy self-contained oceanic drone for AI-based marine information survey and surveillance and a method using the same. A method of monitoring, by a marine vessel system, an ocean condition may include taking in a given amount of seawater or fresh water, performing advanced water treatment on the taken-in seawater or fresh water, performing water electrolysis treatment on the water obtained through the advanced water treatment, generating electric energy using a fuel cell based on hydrogen obtained from the water through the water electrolysis treatment, and supplying the generated electric energy as electric power for the marine vessel system.

6 Claims, 8 Drawing Sheets

(51) Int. Cl.
*G01C 11/00* (2006.01)
*B63H 21/17* (2006.01)
*C25B 1/04* (2021.01)
*H01M 8/0656* (2016.01)
*B63H 21/00* (2006.01)
*C02F 103/00* (2006.01)
*C02F 103/08* (2006.01)

(52) U.S. Cl.
CPC ............ *G01C 11/00* (2013.01); *G01V 1/3808* (2013.01); *H01M 8/0656* (2013.01); *B63H 2021/003* (2013.01); *C02F 2103/008* (2013.01); *C02F 2103/08* (2013.01); *C02F 2201/46165* (2013.01); *C02F 2303/10* (2013.01)

(56) References Cited

U.S. PATENT DOCUMENTS

2005/0190061 A1* 9/2005 Trela .................... G08B 27/001
　　　　　　　　　　　　　　　　　　340/573.1
2007/0104354 A1* 5/2007 Holcomb ............... G01C 11/02
　　　　　　　　　　　　　　　　　　382/109
2012/0068661 A1* 3/2012 Fracas ............... H01M 8/04776
　　　　　　　　　　　　　　　　　　320/101

FOREIGN PATENT DOCUMENTS

| KR | 10-2005-0075628 A | 7/2005 |
| KR | 10-2011-0105463 A | 9/2011 |
| KR | 10-1200561 B1 | 11/2012 |
| KR | 20140038763 A * | 3/2014 |
| KR | 10-1717602 B1 | 3/2017 |
| KR | 10-2005805 | 7/2019 |

OTHER PUBLICATIONS

Office Action Prior to NOA, dated Apr. 19, 2019, issued in Korean Application No. 10-2018-0064760, filed Jun. 5, 2018, 12 pages.

* cited by examiner

ENERGY SELF-CONTAINED OCEANIC DRONE FOR AI-BASED MARINE INFORMATION SURVEY AND SURVEILLANCE AND METHOD USING SAME

CROSS REFERENCE TO RELATED APPLICATION

This application is based on and claims priority under 35 U.S.C. 119 to Korean Patent Application No. 10-2018-0064760, filed on Jun. 5, 2018, in the Korean Intellectual Property Office, the disclosure of which is herein incorporated by reference in its entirety.

BACKGROUND OF THE INVENTION

1. Technical Field

The present invention relates to a marine vessel system for surveying and surveiling marine information and, more particularly, to a technology for monitoring marine information using a boat, such as an oceanic drone.

2. Description of the Related Art

A water electrolysis system is a system for generating hydrogen and oxygen by electrochemically decomposing water, and has been in the spotlight as a hydrogen fabrication technology because it has advantages of a simple driving condition, a small volume and high-purity hydrogen compared to other hydrogen fabrication methods. In the water electrolysis field in which water is electrolyzed, representative methods include solid oxide water electrolysis (SOE), polymer electrolyte membrane water electrolysis (PEME), and alkaline electrolysis (AE).

In the water electrolysis field, a high-temperature vapor electrolysis method is a method using a phenomenon in which electric energy necessary to decompose water is lowered at a high temperature. In this method, water decomposition of high efficiency is possible using small electric energy, and bi-directional driving is possible due to the same structure and principle as those of a solid oxide cell (SOFC).

A fuel cell adopts a method of producing electricity by electrochemically reacting hydrogen with oxygen, and is considered as one of alternative energy technologies due to less environmental pollution and high energy efficiency compared to an internal combustion engine. Particularly, a water electrolysis system for producing hydrogen by electrolyzing water has been in the spotlight from an eco-friendly aspect in which hydrogen purity close to 100% is obtained and only oxygen is discharged as byproducts.

A polymer electrolyte membrane fuel cell (PEMFC) continues to grow through a wide power supply range and various application fields. A guideline regarding the support of new renewable energy facilities was revised in 2013, and the energy yield and the correction coefficient 6.5 were designated. Accordingly, the installation of the PEMFC in public institutions is mandatory, and the PEMFC is rapidly introduced into the market of common people.

From among the application fields of the fuel cell, a transportation field is focused on the vehicle market. Dual cell of Doosan is merged with clear edge power and focused on the production of fuel cells which may be supplied to buildings and vehicle. Hyundai Motor Company plans to produce hydrogen-powered electric cars from January, 2018.

Korea Institute of Energy Research developed a flat plate type high-temperature water electrolysis hydrogen fabrication technology capable of reusing waste heat and vapor of high temperature and high pressure. Ulsan National Institute of Science and Technology developed a solid oxide water electrolysis cell which produces hydrogen of 0.9 L for one hour by applying fuel electrode (anode) and air electrode (cathode) materials of a dual layer to perovskite.

Korean Patent Publication No. 10-2005-0075628 relates to an on-methane reforming type hybrid water electrolysis system, and discloses a technology for efficiently using energy and reducing energy consumption compared to the existing water electrolysis system by performing hydrogen production based on a vapor reforming reaction of methane and a high-temperature water electrolysis reaction at the same time and using heat, generated by an autogenous reaction of methane, and heat, generated by a complete oxidation reaction or partial oxidation reaction of methane, for a water electrolysis apparatus that requires a high-temperature driving condition.

SUMMARY OF THE INVENTION

Embodiments of the present invention are for generating and driving energy in a self-contained manner and monitoring an ocean condition and a river condition in a wide sea or river distant from the ground not adjacent seas close to the ground, even without the supply of energy from a separate external apparatus.

A method of monitoring, by a marine vessel system, an ocean condition may include taking in a given amount of seawater or fresh water, performing advanced water treatment on the taken-in seawater or fresh water, performing water electrolysis treatment on the water obtained through the advanced water treatment, generating electric energy using a fuel cell based on hydrogen obtained from the water through the water electrolysis treatment, and supplying the generated electric energy as electric power for the marine vessel system.

According to an aspect, the method may further include photographing an ocean condition or a river condition around the marine vessel system and monitoring the ocean condition or the river condition based on the photographed information.

According to another aspect, monitoring the ocean condition or the river condition may include monitoring a weather change, a change in a tidal current, an illegal fishing vessel, and whether a disaster vessel has occurred in the sea or a river.

According to yet another aspect, performing the water electrolysis treatment may include storing the obtained hydrogen in a hydrogen storage tank until a predetermined reference amount is reached.

According to yet another aspect, generating the electric energy may include generating the electric energy using at least one of a polymer electrolyte fuel cell, molten carbonate, or a solid oxide fuel cell based on hydrogen corresponding to the reference amount as the reference amount of hydrogen is collected in the hydrogen storage tank.

According to yet another aspect, the method may further include accumulating some of the electric energy, left after being supplied as the electric power, in a battery.

According to yet another aspect, the electric energy accumulated in the battery may be used for at least one of the water electrolysis treatment and the advanced water treatment for extracting hydrogen from the water.

According to yet another aspect, generating the electric energy may include additionally generating electric energy for the water electrolysis treatment and the advanced water treatment using a solar cell.

According to yet another aspect, some of the electric energy, generated using the solar cell and left after being used for the water electrolysis treatment and advanced water treatment, may be accumulated in a battery.

According to yet another aspect, supplying the electric energy as the electric power for the marine vessel system may include autonomously supplying the generated electric energy as the electric power without power supply from an external apparatus separated from the marine vessel system.

According to yet another aspect, at least one apparatus belonging to each function performed in the marine vessel system may be modulated in such a way as to be individually replaced.

A marine vessel system may include a water-intake controller configured to take in a given amount of seawater or fresh water, an advanced water treatment unit configured to perform advanced water treatment on the taken-in seawater or fresh water, a water electrolysis controller configured to perform water electrolysis treatment on the water obtained through the advanced water treatment, an electric energy generator configured to generate electric energy using a fuel cell based on hydrogen obtained from the water through the water electrolysis treatment, and an energy supply controller configured to supply the generated electric energy as electric power for the marine vessel system.

According to an aspect, the marine vessel system may further include a monitoring unit configured to photograph an ocean condition or a river condition around the marine vessel system and to monitor the ocean condition or the river condition based on the photographed information.

According to another aspect, the monitoring unit may monitor a weather change, a change in a tidal current, an illegal fishing vessel, and whether a disaster vessel has occurred in the sea or a river.

According to yet another aspect, the marine vessel system may further include a hydrogen storage tank configured to store the obtained hydrogen until a predetermined reference amount may be reached.

According to yet another aspect, the electric energy generator may generate the electric energy using at least one of a polymer electrolyte fuel cell, molten carbonate, or a solid oxide fuel cell based on hydrogen corresponding to the reference amount as the reference amount of hydrogen is collected in the hydrogen storage tank.

According to yet another aspect, the marine vessel system may further include a battery configured to accumulate some of the electric energy left after being supplied as the electric power.

According to yet another aspect, the electric energy generator may additionally generate the electric energy using a solar cell. The additionally generated electric energy and the electric energy accumulated in the battery may be used for at least one of the water electrolysis treatment and the advanced water treatment for extracting hydrogen from the water.

According to yet another aspect, the battery may accumulate some of the electric energy, generated using the solar cell and left after being used for the water electrolysis treatment and advanced water treatment.

According to yet another aspect, the marine vessel system may further include a heat exhaust pipe configured to discharge heat generated from the marine vessel system. The heat exhaust pipe may be positioned at the top corresponding to the deck of the marine vessel system, the side corresponding to a port side or a starboard, or the back where a motor is positioned.

According to yet another aspect, at least one apparatus belonging to each function performed in the marine vessel system may be modulated in such a way as to be individually replaced.

DETAILED DESCRIPTION

Hereinafter, embodiments of the present invention are described in detail with reference to the accompanying drawings. However, the present invention is not restricted or limited by the embodiments. Furthermore, the same reference numerals denote the same elements throughout the drawing.

The present embodiments relate to a technology in which a marine vessel system generates electric energy based on water electrolysis and a fuel cell, supplies electric power necessary for motor driving in a self-contained manner, and a marine vessel monitors an ocean condition or a river condition in the sea or river at a long distance from the land. Specifically, the present embodiments relate to a technology for providing an energy self-contained oceanic drone on which an ocean survey and monitoring complex sensor is mounted using a polymer electrolyte fuel cell and a solar cell based on new renewable energy complexly.

In the present embodiments, a marine vessel system denotes a motor boat for monitoring an ocean condition and a river condition, that is, a marine vessel. The motor boat may include an oceanic drone, that is, an unmanned boat, in addition to a boat on which a person is boarded.

Figure 1A:
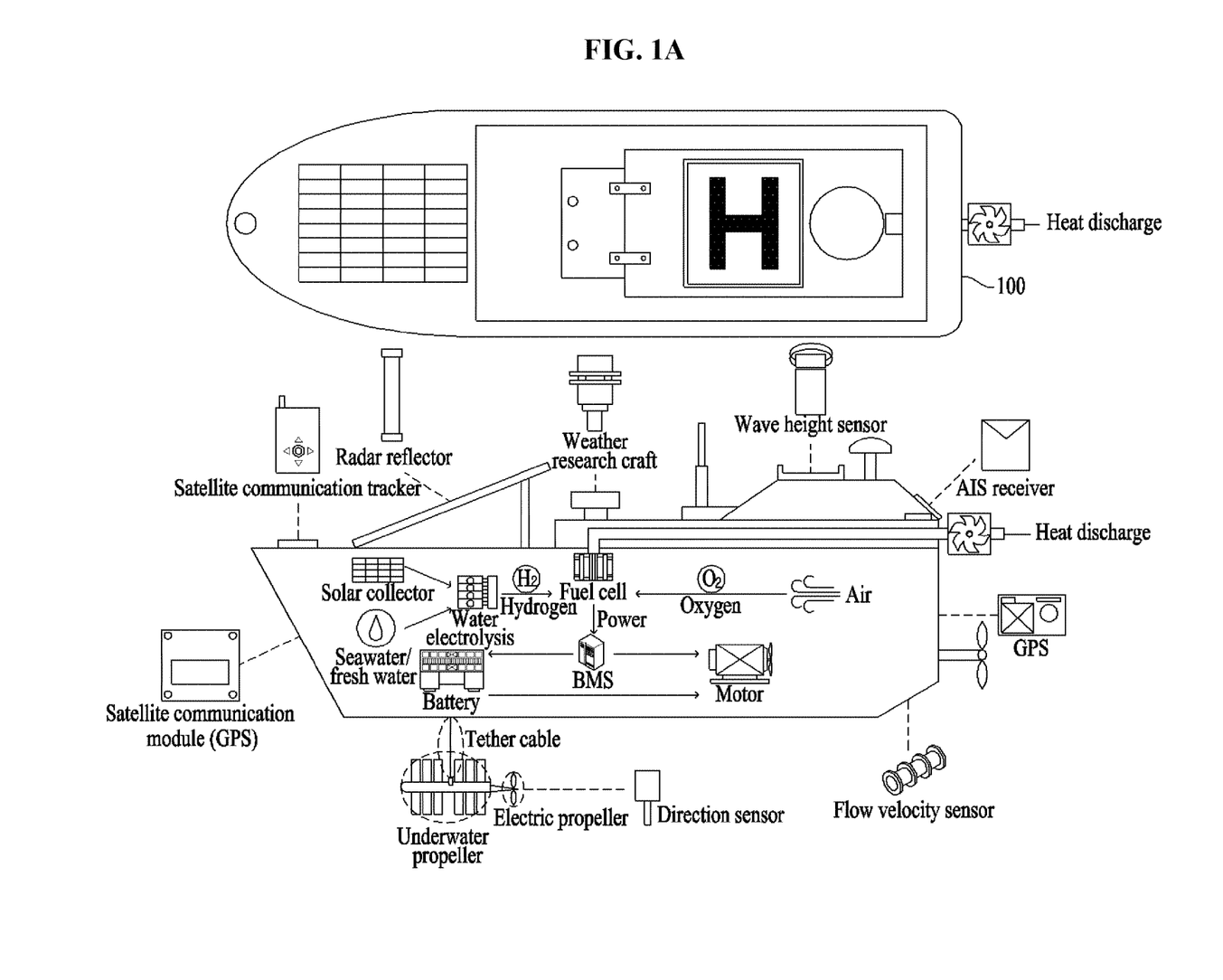
FIGS. 1a and 1b are diagrams showing bird's-eye views of a marine vessel system according to an embodiment of the present invention.
Figure 1B:
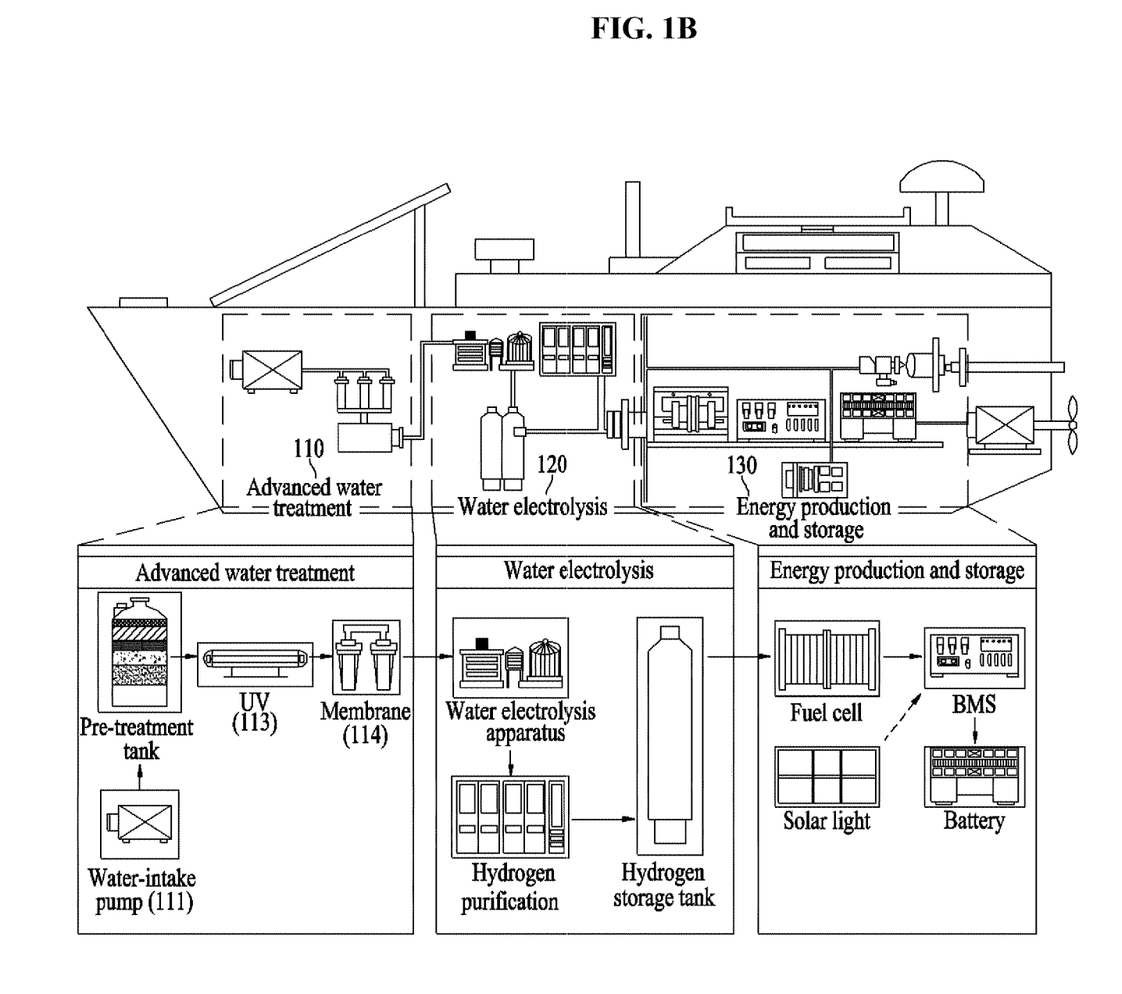

FIGS. 1a and 1b are diagrams showing bird's-eye views of a marine vessel system according to an embodiment of the present invention.

Referring to FIG. 1a, a satellite communication tracker, a radar reflector, a weather research craft, a wave height sensor, an auto identification system (AIS) receiver, and a solar panel (i.e., solar panel) may be mounted on the hull of the marine vessel system 100. For example, the satellite communication tracker may be positioned at the bow, that is, the front end of a vessel. A heat discharger and a flow velocity sensor may be disposed at the rear end of the vessel. The radar reflector of the marine vessel system 100 may detect whether a different vessel is present nearby in order to prevent a collision against the different vessel. In this case, the location of the marine vessel system 100 positioned in the different vessel may be identified at night using a sensor, such as a beacon.

Furthermore, a satellite communication module, water electrolysis, a fuel cell, a motor, and a battery may be disposed at the bottom within the vessel. An underwater propeller, an electric propeller, a direction sensor, and a flow velocity sensor may be disposed outside the bottom of the vessel. The underwater propeller and the bottom of the vessel may be connected by a tether cable.

FIG. 1b is a bird's-eye view in which the marine vessel system 100 has been divided into three areas, including the area in which advanced water treatment is performed, the area in which water electrolysis treatment is performed, and the area in which energy is generated and stored.

Referring to FIG. 1b, the marine vessel system 100 may perform advanced water treatment 110 on fresh water taken in from a river in addition to seawater, in order to obtain water for generating electric energy. The advanced water treatment 110 may be performed on seawater or fresh water taken in through the water-intake pump 111, using a pre-treatment tank 112, a UV 113, and a membrane 114. Accordingly, advanced water treatment high-purity water (i.e., water) can be obtained from seawater or fresh water through the advanced water treatment 110.

Accordingly, water electrolysis treatment 120 may be performed on the obtained water. When a given amount of hydrogen is stored in a hydrogen storage tank through the water electrolysis treatment 120, electric energy for supplying electric power is generated based on the stored hydrogen. Treatment for energy production and storage 130 may be performed in order to accumulate, in the battery, energy left after being supplied as electric power.

Figure 2:
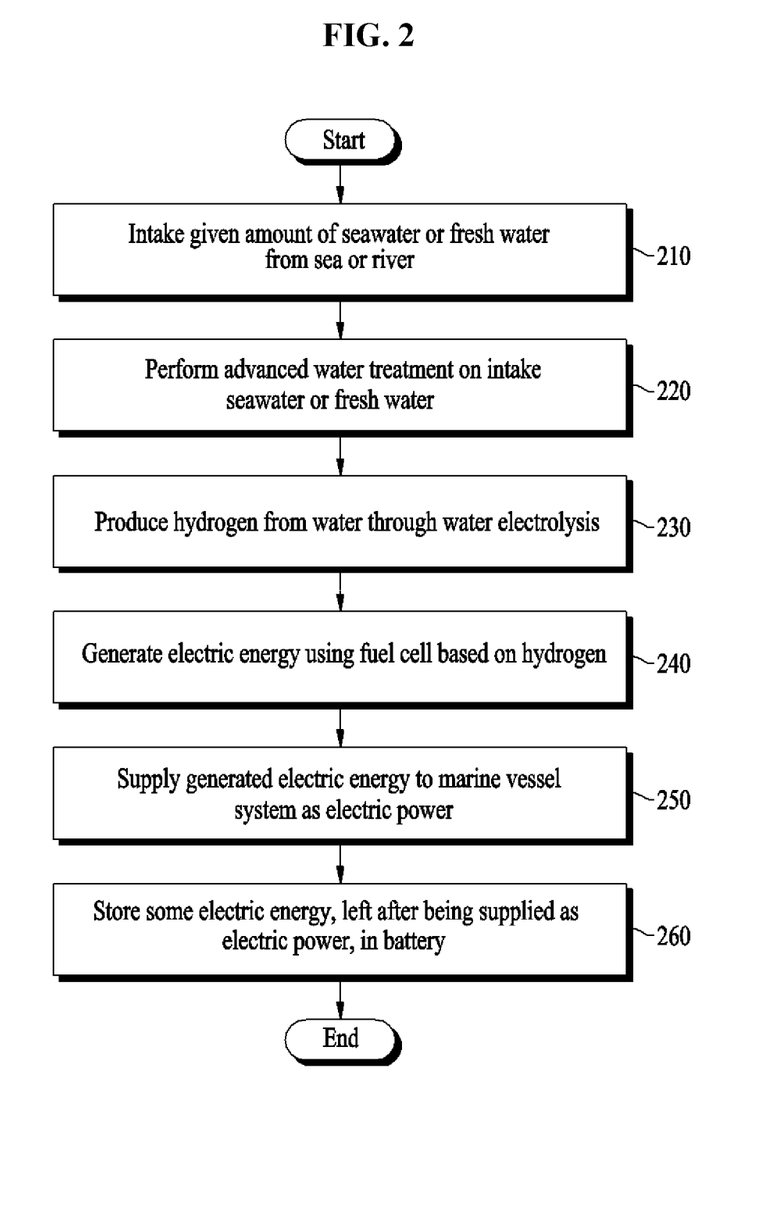
FIG. 2 is a flowchart showing an ocean condition monitoring method of an energy self-contained marine vessel system according to an embodiment of the present invention.
Figure 3:
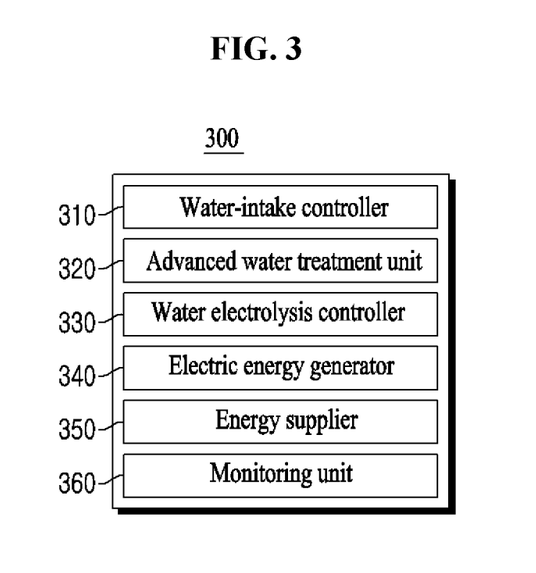
FIG. 3 is a block diagram showing the internal elements of the energy self-contained marine vessel system according to an embodiment of the present invention.

FIG. 2 is a flowchart showing an ocean condition monitoring method of the energy self-contained marine vessel system according to an embodiment of the present invention. FIG. 3 is a block diagram showing the internal elements of the energy self-contained marine vessel system according to an embodiment of the present invention.

Referring to FIG. 3, the marine vessel system 300 may include a water-intake controller 310, an advanced water treatment unit 320, a water electrolysis controller 330, an electric energy generator 340, an energy supplier 350, and a monitoring unit 360. Furthermore, the elements (i.e., steps 210 to 250) of FIG. 2 may be performed by the water-intake controller 310, the water electrolysis controller 330, the electric energy generator 340, the energy supplier 350, and the monitoring unit 360, that is, the elements of the marine vessel system 300 of FIG. 3.

At step 210, the water-intake controller 310 may take in a given amount of seawater or fresh water from the sea or a river.

For example, when the marine vessel system 300 is anchored at a quayside or sails at the sea adjacent to the land or the sea at a long distance where it is difficult to be supplied with insufficient power, the water-intake controller 310 may take in seawater around the marine vessel system 300. For another example, when the marine vessel system 300 sails in a river, the water-intake controller 310 may take in fresh water around the marine vessel system 300. In this case, the water-intake controller 310 may correspond to a water-intake pump.

At step 220, the advanced water treatment unit 320 may perform advanced water treatment on the seawater or fresh water, taken in by the water-intake pump, using the pre-treatment tank, the UV, and the membrane in order to obtain high-purity clean water by removing impurities from the seawater or fresh water. For example, the advanced water treatment unit 320 may remove floating matters using the pre-treatment tank, and may filter out particles, such as a dirty taste, smell, an organic matter, an inorganic matter, and heavy metal, from the seawater or fresh water from which the floating matters have been removed using the membrane. Next, the advanced water treatment unit 320 may perform sterilization processing on the filtered fresh water and seawater sing the UV lamp. That is, the advanced water treatment unit 320 may obtain water of a predetermined clean grade by extracting hydrogen for generating electric energy from the seawater or fresh water through impurities removal, particles filtering, and sterilization treatment.

At step 230, the water electrolysis controller 330 may perform water electrolysis treatment for extracting hydrogen from the advanced water-treated water. In this case, the water electrolysis controller 330 may extract hydrogen from the water through electrolysis.

For example, the water electrolysis controller 330 may extract hydrogen from the advanced water-treated fresh water or seawater using at least one of an alkaline water electrolysis scheme (AE), a solid oxide water electrolysis scheme (SOE), a solid oxide cell (SOFC) or a solid oxide water electrolysis cell.

Accordingly, the water electrolysis controller 330 may store the extracted hydrogen in the hydrogen storage tank. For example, the water electrolysis controller 330 may store the extracted hydrogen in the hydrogen storage tank until the extracted hydrogen reaches a predetermined reference amount. That is, electric energy which may be used for electric power can be generated only when a specific amount of hydrogen is collected. If electric energy is immediately generated based on extracted hydrogen, the amount of generated electric energy is small and energy consumption necessary to produce the electric energy is great. Accordingly, in order to reduce unnecessary energy consumption, extracted hydrogen may be stored in the hydrogen storage tank until a reference amount of hydrogen is collected.

At step 240, the electric energy generator 340 may generate electric energy using the fuel cell based on the generated hydrogen. In this case, the electric energy generator 340 may autonomously generate electric energy without power supply from an external apparatus (e.g., a different vessel or a ground energy supply apparatus for energy supply around the marine vessel system), which is present separated from the marine vessel system.

For example, the electric energy generator 340 may identify whether a reference amount of hydrogen or more has been stored in the hydrogen storage tank using a sensor positioned in the hydrogen storage tank. If the reference amount of hydrogen or more has been collected, the electric energy generator 340 may generate electric energy by extracting hydrogen from the hydrogen storage tank. For example, the electric energy generator 340 may extract hydrogen for producing electric energy by adjusting pressure of hydrogen (i.e., hydrogen gas) stored in the hydrogen storage tank. The electric energy generator 340 may generate electric energy based on the extracted hydrogen using the fuel cell. For example, the electric energy generator 340 may generate electric energy using at least one of a polymer electrolyte fuel cell, molten carbonate or a solid oxide fuel cell.

In this case, when the amount of hydrogen stored in the hydrogen storage tank is smaller than the reference amount, the electric energy generator 340 may wait until the reference amount of hydrogen or more is collected, and then may generate electric energy.

At step 250, the energy supply controller 350 may control the generated electric energy so that it is supplied as electric power for the marine vessel system. For example, the energy supply controller 350 may control supply so that the electric energy is used as power for the driving motor that drives the marine vessel system 300. As described above, when the electric energy is used as electric power and thus the motor is driven, the monitoring unit 360 may monitor an ocean condition using various sensors mounted on the marine vessel system 300.

At step 260, the energy supply controller 350 may control supply so that some of electric energy left after being supplied as electric power for the driving motor is stored in the battery.

For example, electric energy accumulated in the battery may be used for water electrolysis treatment. That is, electric energy accumulated in the battery may be used as power which is necessary when a water electrolysis scheme for extracting hydrogen from advanced water-treated water is applied. For another example, electric energy accumulated in the battery may be used for advanced water treatment. That is, electric energy accumulated in the battery may be used as power necessary for a process for performing water treatment on taken-in seawater or fresh water to the extent that water electrolysis treatment is possible for the water.

In this case, electric energy accumulated in the battery may be insufficient for power consumed for the water electrolysis treatment and the advanced water treatment. In this case, the energy supply controller 350 may control supply so that electric energy generated using the solar cell is supplied as power for water electrolysis (i.e., electrolysis) and advanced water treatment as an emergency use. The electric energy generated using the solar cell may also be accumulated in the battery.

For example, a solar light panel (i.e., solar panel) may be positioned at the bow of a vessel. Electric energy generated using the solar cell based on solar light collected by the solar light panel while the sun rises may be accumulated in the battery as emergency power for water electrolysis and advanced water treatment. The electric energy accumulated for an emergency use as described above may be used for water electrolysis treatment and advanced water treatment for extracting hydrogen or may be used to drive the motor depending on the condition.

When the marine vessel system 300 runs in the sea by driving the motor, the monitoring unit 360 may monitor ocean conditions in the sea or a river, such as a weather change, a change in the tidal current, an illegal fishing vessel and whether a disaster vessel has occurred. That is, the monitoring unit 360 may always check ocean and river-related information and whether a disaster has occurred in the ocean space or a river. In this case, the monitoring unit 360 may collect information, such as an image photographed in relation to the sea or river, using electric energy accumulated in the battery without the supply of an external power source, and may detect an illegal fishing vessel or the occurrence of a disaster vessel based on the collected information.

For example, the monitoring unit 360 may identify the location of the marine vessel system 300 based on the GPS, and may detect an illegal fishing vessel other than permitted domestic and foreign vessels based on the identified location. In this case, environments (e.g., weather, other vessels, and a tide in the sea) around the marine vessel system may be photographed using a 360° wide-angle camera. The monitoring unit 360 may monitor a weather change, a change in the tidal current, and whether a disaster vessel has occurred by analyzing the photographed information.

In addition, the monitoring unit 360 may detect whether an illegal fishing vessel is present around the marine vessel system 300 based on an image, corresponding to a previously stored illegal fishing vessel, and photographed information. For example, when a matching ratio of the photographed information and an image corresponding to the previously stored illegal fishing vessel is a predetermined ratio or more, the monitoring unit 360 may detect that an illegal fishing vessel is present. Accordingly, the monitoring unit 360 may output an alarm, providing notification that an illegal fishing vessel has been detected, through a speaker, and may notify the user terminal (e.g., smartphone) or central control system (not shown) of a corresponding administrator of guidance information, providing notification that an illegal fishing vessel has been detected, along with an image of the illegal fishing vessel through the communication module. In this case, the monitoring unit 360 may also deliver information on the current location of the marine vessel system 300 based on the GPS so that the corresponding administrator and the central control system can easily identify the location of the illegal fishing vessel or a disaster vessel and take proper measures. Furthermore, direction information measured by a compass sensor and viewed from the marine vessel system 300 may be delivered along with the location information. Information collected through monitoring and guidance information, providing notification of a detected condition, may be provided to the system (e.g., Ministry of Maritime Affairs and Fisheries, Korea Hydrographic and Oceanographic Agency, the marine police, a local government, a user terminal of a private organization) of the relevant authorities and institute in addition to the central control center (not shown).

If the marine vessel system 300 is a manned boat on which a person has boarded not an unmanned boat, the monitoring unit 360 displays an image of a fishing vessel on a screen (i.e., display device) within a vessel and/or the user terminal (e.g., smartphone) of a corresponding administrator along with guidance information providing notification that the image corresponds to an illegal fishing vessel so that a crew or the persons concerned within the vessel can rapidly take measures against the illegal fishing vessel.

In addition, when a disaster occurs, the monitoring unit 360 may display guidance information, providing notification that the disaster has occurred, on a screen within the vessel and/or the user terminal of a corresponding administrator along with an image of a disaster vessel. In this case, if information (e.g., passengers, nationality) related to the disaster vessel has been obtained from the central control center (not shown) on the ground through the wireless communication module, the monitoring unit 360 may additionally provide the screen and/or the user terminal with the information related to the disaster vessel. Furthermore, when the condition is changed in real time due to rescue activities, for example, information, such as the number of persons rescued and the number of persons missing changed due to a rescue condition compared to passengers may be provided to the screen and/or the user terminal.

For another example, the monitoring unit 360 may monitor whether pollution occurs in the sea or a river based on previously stored images related to ocean or river pollution and photographed information. That is, the monitoring unit 360 may monitor a vessel that illegally empts environmental waste in the offing or a vessel from which oil leaks due to a disaster or damage.

For another example, the monitoring unit 360 may monitor a degree of pollution of an ocean or river resource under water based on photographed information. When the state of a monitored ocean or river resource corresponds to a predetermined pollution level, the monitoring unit 360 may notify the central control center (not shown) of guidance information, providing notification that the pollution of an ocean or river resource is suspected, along with photographed information.

For another example, the monitoring unit 360 may monitor a change in the flow velocity and flux by collecting information on the flow velocity and flux of a surrounding ocean using a sensor, such as an acoustic Doppler current profiler. Furthermore, the monitoring unit 360 may monitor a temperature, degree of electrolysis and/or water level of the sea or river, which is measured using an SBE37IM sensor. The monitoring unit 360 may monitor water quality using an AAQ1183 sensor. The AAQ1183 sensor is a multi-element water quality measuring sensor, and may detect a temperature, salt, a water level, dissolved oxygen, PH, turbidity, and chlorophyll.

For another example, the monitoring unit 360 may monitor a weather change (i.e., atmospheric change) of the sea or a river. For example, the monitoring unit 360 may monitor the direction of the wind and the velocity of the wind using a wind sensor, and may monitor a monitoring direction using the compass. That is, the compass may be used to correct the direction of the wind. A relation humidity sensor may be used for humidity measurement. Sensors used for a weather change and a change in the tidal current may be as follows in Table 1 and Table 2.

TABLE 1

| Sensor name | | Observation information | Notes |
|---|---|---|---|
| Wind | Direction | Direction of wind | Measuring range of 0~360° is measured in unit of 1°, and precision is ±3° |
| | Speed | Velocity of wind | Measuring range of 0~60 m/s is measured in unit of 0.025 m/s, and precision is ±0.3 m/s |
| Compass | | Observation direction | Correct direction of wind |
| Relation humidity | | Humidity | Measuring range of 0.8~100% is measured in unit of 0.1%, and precision is ±1% |
| Air temperature | | Temperature | Measuring range of −39.2~+60° is measured in unit of 0.01°, and precision is ±0.2° |
| Barometric pressure | | Atmospheric pressure | Measuring range of 800~1060 hPa is measured in unit of 0.1 hPa, and precision is ±0.3 hPa |
| Tiny wave | | Wave height | Observe electronic acceleration system, wave height, and wave cycle |
| Precision infrared radiometer | | Long wave radiation energy | Convert radiation energy into heat |
| Precision spectral pyranometer | | Short wave radiation energy | Measure solar radiation quantity in the whole sky |

TABLE 1-continued

| Sensor name | Observation information | Notes |
|---|---|---|
| Present weather and visibility sensor | Visibility | Measuring range of 10 m~20 km is measured in unit of 1 m, and weather and rainfall are measured |
| Tipping bucket rain gauge | Rainfall | Measuring range of 0~50 mm is measured in unit of 0.2 mm/hr, and precision is ±2 mm/hr |

TABLE 2

| Sensor name | Observation information | Notes |
|---|---|---|
| Acoustic Doppler current profiler | Flow velocity, flux | Acoustic Doppler current profiler (hereinafter ADCP) fabricated by TRDI Co. of U.S.A. is a sensor for observing the flow velocity and flux for each floor of water level using a Doppler method. In general, a measuring range of flow velocity can be measured in range of 5 m/s and up to a maximum range of 10 m/s can be measured. |
| SBE371M | Conductivity (degree of electrolysis) Temperature Depth | A sensor for measuring a degree of electrolysis, a temperature, and a water level and also called a CDT sensor. A surface inductive modem (SIM) and an inductive cable coupler (ICC) are installed. Ocean can be measured in real time through the modem under water without recovering the sensor. It communicates with the sensor through the modem. The sensor can be positioned for each water level necessary for a user. |
| AAQ1183 | Water quality | A multi-element water quality measuring unit, which measures a temperature, salt, a water level, dissolved oxygen, PH, turbidity, and chlorophyll |

Figure 4:
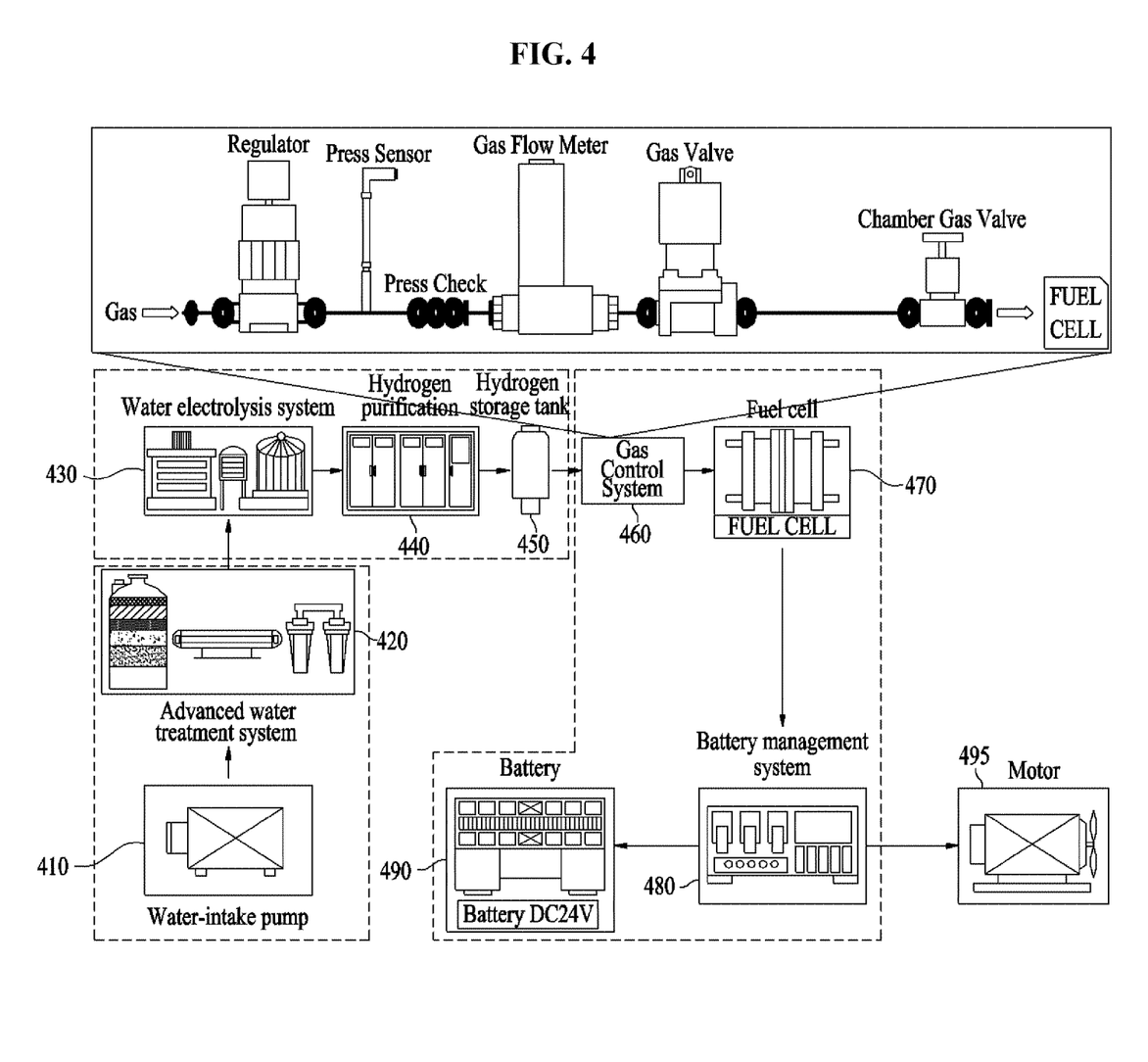
FIG. 4 is a block diagram showing the detailed elements of a marine vessel system for supplying energy in a self-contained manner based on water electrolysis and a fuel cell according to an embodiment of the present invention.

FIG. 4 is a block diagram showing the detailed elements of a marine vessel system for supplying energy in a self-contained manner based on water electrolysis and a fuel cell according to an embodiment of the present invention.

In FIG. 4, a water-intake pump 410 may correspond to the water-intake controller 310 of FIG. 3 and the water-intake pump 111 of FIG. 1b. An advanced water treatment system 420 may correspond to the advanced water treatment unit 320 of FIG. 3 and the advanced water treatment 110, including the pre-treatment tank 112, the UV 113 and the membrane 114 of FIG. 1b. Furthermore, the water electrolysis system 430, hydrogen purification unit 440, and hydrogen storage tank 450 of FIG. 4 may correspond to the water electrolysis controller 330 of FIG. 3 and the water electrolysis treatment 120 of FIG. 1b. The gas control system 460 and fuel cell 470 of FIG. 4 may correspond to the electric energy generator 330 of FIG. 3. A battery management system 480 may correspond to the energy supply controller 350 of FIG. 3. The gas control system 460, the fuel cell 470, the battery management system 480, and the battery 490 may correspond to the module for energy production and storage 130 of FIG. 1b. Accordingly, the description of a portion redundant with the contents described in FIG. 3 is omitted.

Referring to FIG. 4, when the water electrolysis system 430 extracts hydrogen from seawater, the hydrogen purification unit 440 may purify the extracted hydrogen. Accordingly, the purified hydrogen may be stored in the hydrogen storage tank 450.

The gas control system 460 may include a regulator, a pressure sensor, a pressure check unit, a gas flow meter, a gas valve, and a chamber. The chamber may be connected to the fuel cell 470.

For example, when a reference amount of hydrogen is collected in the hydrogen storage tank 450, the gas control system 460 may supply the hydrogen to the fuel cell 470 by controlling pressure of the hydrogen supplied from the hydrogen storage tank 450. Accordingly, the fuel cell 470 (e.g., a polymer electrolyte fuel cell of PEMFC, DMFC or SOFC) may generate electric energy based on the hydrogen. The generated electric energy may be supplied to a motor 495, thus driving the marine vessel system 300. The fuel cell 470 may be configured with a fuel cell stack by applying a platinum-iridium electrode applicable to a moisture-exposed environment and a separation film for moisture control. Proper hydrogen gas partial pressure of the fuel cell stack may be determined. Furthermore, a temperature and humidity for driving the fuel cell may be optimized based on an oxygen supply method of a passive method. The fuel cell 470 may store power generated in DC, that is, may convert electric energy into AC and store AC.

When the water-intake pump 410 continues to take in seawater or fresh water, hydrogen continues to be extracted. As a result, electric energy may continue to be generated through the fuel cell 470. Accordingly, although the marine vessel system 300 is in the environment in which it is difficult for the system to be supplied with energy for driving because the system is positioned at a long distance from a land, that is, in the sea or a river, the marine vessel system can continuously monitor an ocean condition and a river condition regardless of the location of the marine vessel system 300.

In this case, some of electric energy left after being used for the driving of the motor may be accumulated in the battery 490 and used as power necessary to decompose hydrogen in the water electrolysis system 430. Furthermore, electric energy for emergency, generated from a solar cell, may be additionally accumulated in the battery 490 for the water electrolysis system 430. In addition, if electric energy generated through water electrolysis and the fuel cell is insufficient to drive the motor 495, electric energy generated using the solar cell may be used to drive the motor 495. Furthermore, electric energy generated using the solar cell and accumulated in the battery 490 may be used to drive the motor 495.

Figure 5:
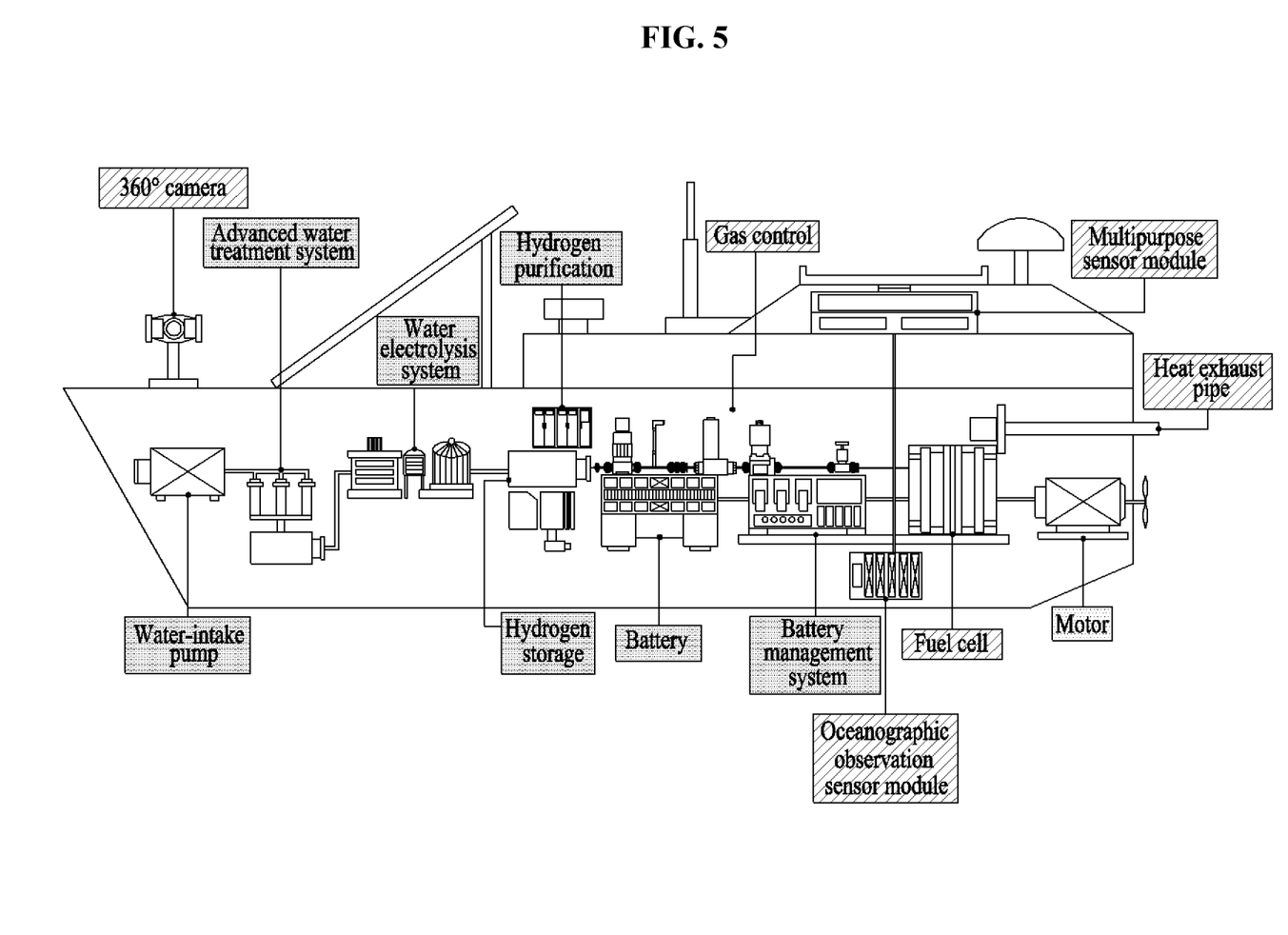
FIG. 5 is a block diagram in which a corresponding device has been modulated for each function of the marine vessel system according to an embodiment of the present invention.

FIG. 5 is a block diagram in which a corresponding device has been modulated for each function of the marine vessel system according to an embodiment of the present invention.

The marine vessel system 300 may modulate at least one apparatus, respectively, belonging to at least one function performed in the marine vessel system by dividing at least one apparatus for each function. That is, if a repair or replacement attributable to a failure is necessary for each function, the apparatus may be modulated so that it can be repaired or replaced without affecting other functions.

Referring to FIG. 5, the water-intake pump and the advanced water treatment system, that is, apparatuses related to the advanced water treatment function, may be modulated into one. Furthermore, the water electrolysis system, the hydrogen purification unit, and the hydrogen storage tank, that is, apparatuses related to the water electrolysis function, may be modulated into one. Likewise, the battery, the battery management system, and the motor, that is, apparatuses related to the function for providing power to the motor, may be modulated into one. In addition, apparatuses related to the function for monitoring and the function related to energy generation, that is, the 360° rotation camera, gas control, the multipurpose sensor module, the heat exhaust pipe for discharging heat, the fuel cell, and the ocean observation sensor module, may be modulated into one. The heat exhaust pipe is an apparatus for discharging heat, generated from the marine vessel system 300, to the outside. In general, the heat exhaust pipe may be present in a form that rises like a chimney at the top where the deck of a marine vessel is positioned or may be positioned on the side of the portside or starboard of a vessel or at the back of a vessel where the motor is positioned. For example, if ocean observation is positioned at the deck of a vessel, several exhaust pipes may be disposed at the back of a vessel because an exhaust pipe space is insufficient.

In this case, the apparatus related to the function for monitoring and the apparatus related to the function for energy generation may be individually modulated. That is, the 360° rotation camera, the multipurpose sensor module, and the ocean observation sensor module may be modulated into one. The gas control, the heat exhaust pipe for discharging heat, and the fuel cell may be modulated into one.

Figure 6:
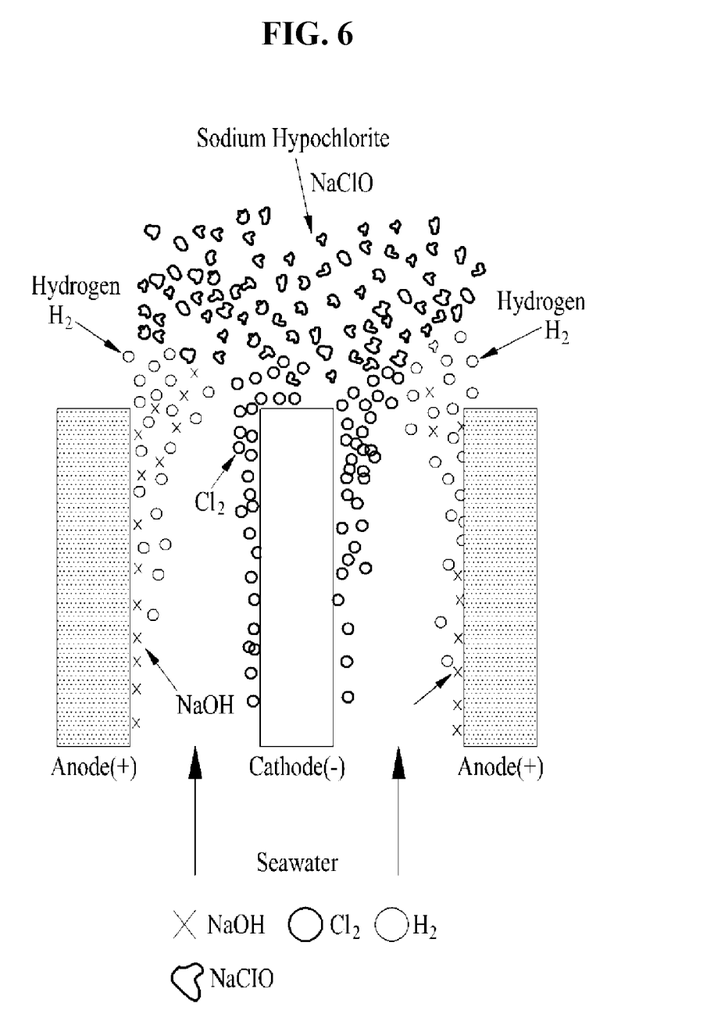
FIG. 6 is a diagram showing an operation of extracting hydrogen from seawater through water electrolysis treatment according to an embodiment of the present invention.
Figure 7:
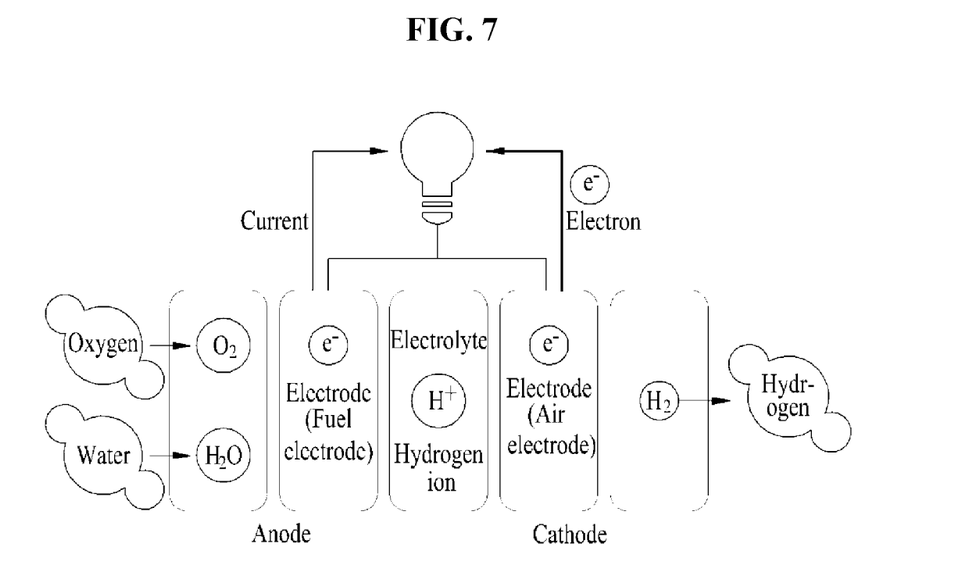
FIG. 7 is a diagram showing an operation of extracting hydrogen from fresh water through water electrolysis treatment according to an embodiment of the present invention.

FIG. 6 is a diagram showing an operation of extracting hydrogen from seawater through water electrolysis treatment according to an embodiment of the present invention. FIG. 7 is a diagram showing an operation of extracting hydrogen from fresh water through water electrolysis treatment according to an embodiment of the present invention.

Seawater of FIG. 6 may correspond to water obtained by performing advanced water treatment on seawater taken in through the water-intake pump. Accordingly, the water electrolysis controller 330 may perform hydrogen electrolysis on seawater-based water. That is, the water electrolysis controller 330 may generate ions ($Na^+$, $Cl^-$, $H^+$ and $OH^-$) by electrolyzing (NaCl) and water ($H_2O$) from the seawater-based water. Accordingly, $Cl^-$ of the generated ions ($Na^+$, $Cl^-$, $H^+$ and $OH^-$) may move to the anode (+), thereby generating chlorine ($Cl_2$). At this time, $H^+$ of the ions may move to the cathode (−), thereby generating hydrogen gas ($H_2$). As described above, electrolysis may be performed on the seawater-based water, so hydrogen ($H_2$) can be extracted. Such an electrolysis reaction may be the same as Table 3 below.

TABLE 3

| Anode (+) | $2Cl^- \rightarrow Cl_2 + 2e^-$ |
|---|---|
| Cathode (−) | $2H^+ + 2e \rightarrow H_2$ |
| Total reaction | $Na^+ + OH^- \rightarrow NaOH$ |
| | $Cl_2 + 2NaOH \rightarrow 2NaOCl + H_2$ |

Water of FIG. 7 may correspond to water obtained by performing advanced water treatment on fresh water taken in through the water-intake pump. Accordingly, the water electrolysis controller 330 may perform hydrogen electrolysis on fresh water-based water. That is, water ($H_2O$), that is, water, may be electrolyzed to generate ions ($Na^+$, $Cl^-$, $H^+$ and $OH^-$). Accordingly, $Cl^-$ of the generated ions ($Na^+$, $Cl^-$, $H^+$ and $OH^-$) may move to the anode, thereby generating chlorine ($Cl_2$). At this time, $H^+$ of the ions may move to cathode to generate hydrogen gas ($H_2$). The process of extracting hydrogen from fresh water-based water through electrolysis may be the same as Table 4 below.

TABLE 4

| | |
|---|---|
| Anode (+) | $2H^+ + 2e^- \rightarrow H_2$ |
| Cathode (−) | $H_2O \rightarrow \frac{1}{2}O_2 + 2H^+ + 2e$ |
| Total reaction | $H_2O \rightarrow H_2 + \frac{1}{2}O_2$ |

The above-described apparatus may be implemented in the form of a hardware component, a software component or a combination of a hardware component and a software component. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, code, an instruction or one or more combinations of them and may configure the processing device so that it operates as desired or may instruct the processing device independently or collectively. Software and/or data may be interpreted by the processing device or may be embodied in a machine, component, physical device, virtual equipment or computer storage medium or device of any type or a transmitted signal wave permanently or temporarily in order to provide an instruction or data to the processing device. Software may be distributed to computer systems connected over a network and may be stored or executed in a distributed manner. Software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server. Examples of the program instruction may include machine-language code, such as code written by a compiler, and high-level language code executable by a computer using an interpreter. The hardware apparatus may be configured to operate one or more software modules in order to perform an operation of an embodiment, and vice versa.

According to an embodiment of the present invention, electric energy is generated based on seawater or fresh water taken in from a wide ser or a river distant from the ground not an adjacent sea or river close to the ground. Accordingly, energy can be generated and a motor can be driven in a self-contained manner even without power supply from a separate external apparatus, and an ocean condition and a river condition can be monitored.

Furthermore, hydrogen production efficiency can be enhanced and a maintenance and management cost for the water electrolysis system can be reduced because water electrolysis treatment is performed based on two types of seawater and fresh water through advanced water treatment. That is, if a vessel on which freight has been loaded through a river or a canal in the sea runs, electric energy is generated using hydrogen decomposed from fresh water taken in from the river through the canal. Accordingly, although the vessel sails from the sea to the river through the canal, it can stably supply self-electric power. Furthermore, the vessel can supply electric power necessary for river surveillance.

As described above, although the embodiments have been described in connection with the limited embodiments and the drawings, those skilled in the art may modify and change the embodiments in various ways from the description. For example, proper results may be achieved although the above-described descriptions are performed in order different from that of the described method and/or the above-described elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:
1. A method of monitoring, by a marine vessel system, an ocean condition, the method comprising:
   taking in a given amount of seawater or fresh water;
   performing advanced water treatment on the taken-in seawater or fresh water;
   performing water electrolysis treatment on the water obtained through the advanced water treatment;
   generating electric energy using a fuel cell based on hydrogen obtained from the water through the water electrolysis treatment; and
   supplying the generated electric energy as electric power for the marine vessel system,
   wherein the method further comprises accumulating some of the electric energy, left after being supplied as the electric power, in a battery,
   wherein the electric energy accumulated in the battery is used for the water electrolysis treatment and the advanced water treatment for extracting hydrogen from the water,
   wherein electric energy generated from a solar cell is additionally accumulated in the battery as electric energy for emergency,
   wherein, in response that said some of the electric energy accumulated in the battery, left after being supplied as the electric power, is insufficient for the water electrolysis treatment and the advanced water treatment, and in response that the generated electric energy using the fuel cell is insufficient to drive a motor of the marine vessel system, the electric energy for emergency is used for the water electrolysis treatment and the advanced water treatment and used for driving the motor, wherein the method further comprises photographing an ocean condition or a river condition around the marine vessel system, and monitoring the ocean condition or the river condition based on the photographed information, the monitoring of the ocean condition or the river condition comprises:

monitoring a weather change, a change in a tidal current, an illegal fishing vessel, and whether a disaster vessel has occurred in a sea or a river, detecting, based on the photographed information, whether an illegal fishing vessel is present around the marine vessel system, determining the detection of the illegal fishing vessel being present around the marine vessel system in response that a matching ratio of the photographed information to a previously stored image of illegal fishing vessel is a predetermined ratio or more, in response to the detection of the illegal fishing vessel being present around the marine vessel system, outputting an alarm through a speaker, and providing a user terminal of administrator or central control system with a first notification that the illegal fishing vessel is present around the marine vessel system along with an image of the detected illegal fishing vessel, monitoring, based on the photographed information, a degree of pollution of the sea or the river, and in response that the monitored degree of pollution corresponds to a predetermined pollution level, providing the central control system with a second notification that pollution of the sea or the river has occurred along with the photographed information, wherein performing the water electrolysis treatment comprises:

storing the obtained hydrogen in a hydrogen storage tank, monitoring an amount of the obtained hydrogen in the hydrogen storage tank by a sensor of the hydrogen storage tank, and determining whether the amount of the obtained hydrogen in the hydrogen storage tank is equal to or more than a predetermined reference amount or not, and wherein generating the electric energy comprises:

in response that the amount of the obtained hydrogen in the hydrogen storage tank is equal to or more than the predetermined reference amount, extracting hydrogen from the hydrogen storage tank, and generating the electric energy using the fuel cell including at least one of a polymer electrolyte fuel cell, molten carbonate, or a solid oxide fuel cell from the extracted hydrogen.

2. The method of claim 1, wherein supplying the electric energy as the electric power for the marine vessel system comprises autonomously supplying the generated electric energy as the electric power without power supply from an external apparatus separated from the marine vessel system.

3. The method of claim 1, wherein at least one apparatus belonging to each function performed in the marine vessel system is modulated in such a way as to be individually replaced.

4. A marine vessel system, comprising:
a water-intake controller configured to take in a given amount of seawater or fresh water;
an advanced water treatment unit configured to perform advanced water treatment on the taken-in seawater or fresh water;
a water electrolysis controller configured to perform water electrolysis treatment on the water obtained through the advanced water treatment;
an electric energy generator configured to generate electric energy using a fuel cell based on hydrogen obtained from the water through the water electrolysis treatment;
an energy supply controller configured to supply the generated electric energy as electric power for the marine vessel system;
a solar cell;
a battery; and
a battery management system for controlling the battery,
wherein, by the control of the battery management system, some of the electric energy, left after being supplied as the electric power, is accumulated in the battery, and the electric energy accumulated in the battery is used for the water electrolysis treatment and the advanced water treatment for extracting hydrogen from the water,
wherein, by the control of the battery management system, electric energy generated from the solar cell is additionally accumulated in the battery as electric energy for emergency,
wherein, in response that said some of the electric energy accumulated in the battery, left after being supplied as the electric power, is insufficient for the water electrolysis treatment and the advanced water treatment, and in response that the generated electric energy using the fuel cell is insufficient to drive a motor of the marine vessel system,
the electric energy for emergency is used for the water electrolysis treatment and the advanced water treatment and used for driving the motor,
wherein the marine vessel system further comprises a monitoring unit configured to photograph an ocean condition or a river condition around the marine vessel system and to monitor a weather change, a change in a tidal current, an illegal fishing vessel, and whether a disaster vessel has occurred in a sea or a river based on the photographed information,
wherein the monitoring unit is configured to
detect, based on the photographed information, whether an illegal fishing vessel is present around the marine vessel system,
determine the detection of the illegal fishing vessel being present around the marine vessel system in response that a matching ratio of the photographed information to a previously stored image of illegal fishing vessel is a predetermined ratio or more, and
in response to the detection of the illegal fishing vessel being present around the marine vessel system, output an alarm through a speaker, and provide a user terminal of administrator or central control system with a first notification that the illegal fishing vessel is present around the marine vessel system along with an image of the detected illegal fishing vessel,
monitor, based on the photographed information, a degree of pollution of the sea or the river, and
in response that the monitored degree of pollution corresponds to a predetermined pollution level, provide the central control system with a second notification that pollution of the see or the river has occurred along with the photographed information, wherein the marine vessel system further comprises a hydrogen storage tank including a sensor, the hydrogen storage tank stores the obtained hydrogen therein, an amount of the obtained hydrogen in the hydrogen storage tank is monitored by the sensor of the hydrogen storage tank, and whether the amount of the obtained hydrogen in the hydrogen storage tank being equal to or more than a predetermined reference amount or not is determined, and wherein, in response that the amount of the obtained hydrogen in the hydrogen storage tank is equal to or more than the predetermined reference amount, hydrogen is extracted from the hydrogen storage tank, and the electric energy generator generates the electric energy using the fuel cell including at least one of a polymer electrolyte fuel cell, molten carbonate, or a solid oxide fuel cell from the extracted hydrogen.

5. The marine vessel system of claim 4, further comprising a heat exhaust pipe configured to discharge heat generated from the marine vessel system, wherein the heat exhaust pipe is positioned at a top corresponding to a deck of the marine vessel system, a side corresponding to a port side or a starboard, or a back where a motor is positioned.

6. The marine vessel system of claim 4, wherein at least one apparatus belonging to each function performed in the marine vessel system is modulated in such a way as to be individually replaced.

* * * * *

UNITED STATES PATENT AND TRADEMARK OFFICE
CERTIFICATE OF CORRECTION

PATENT NO. : 11,014,837 B2  
APPLICATION NO. : 16/432688  
DATED : May 25, 2021  
INVENTOR(S) : S. Gwon et al.

Page 1 of 1

It is certified that error appears in the above-identified patent and that said Letters Patent is hereby corrected as shown below:

In the Claims

| Column | Line | |
|---|---|---|
| 17 | 1 | In Claim 4, Please change "see" to -- sea --. |

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*